Patented May 23, 1950

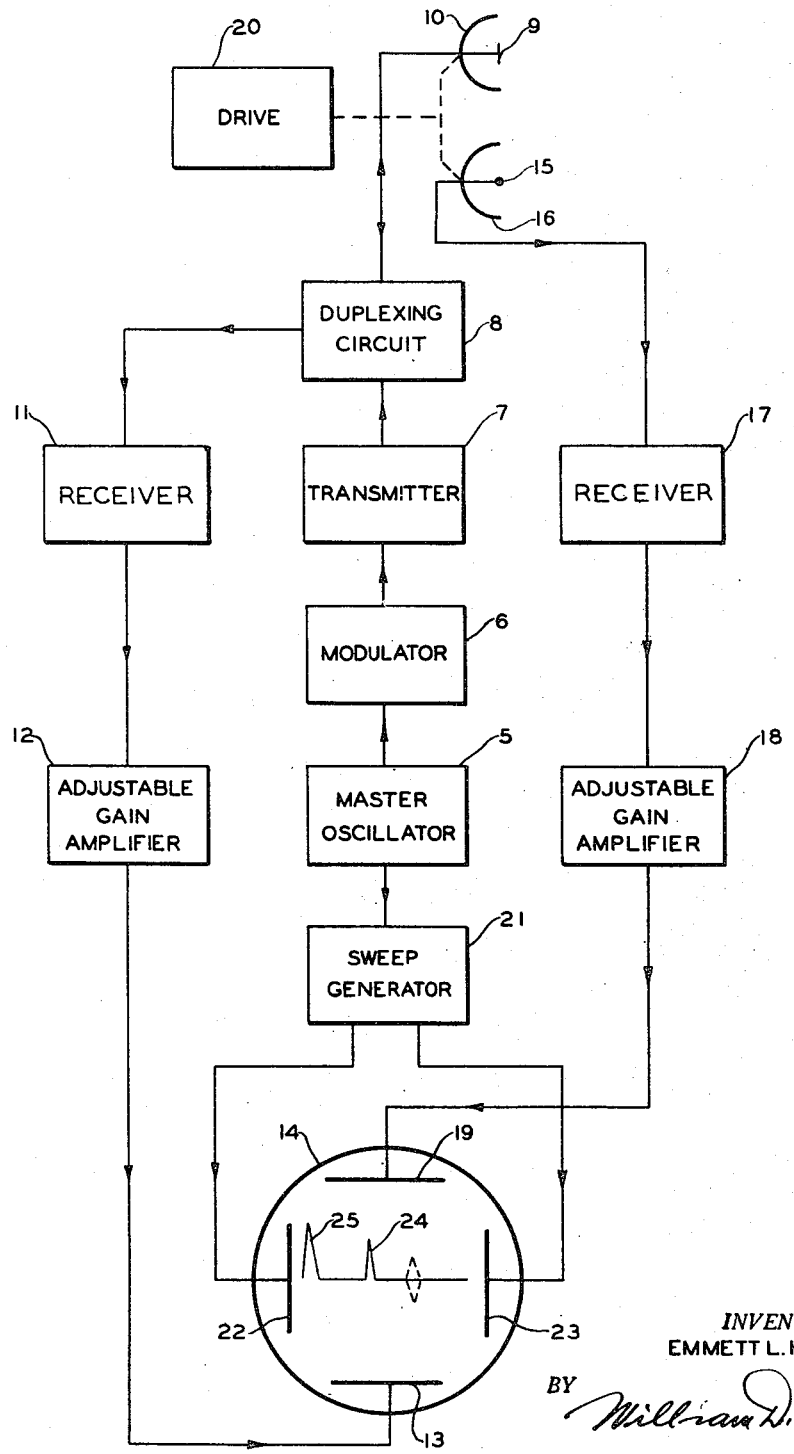

2,508,571

UNITED STATES PATENT OFFICE 2,508,571

RADIO ECHO DETECTION APPARATUS

Emmett L. Hudspeth, Cambridge, Mass., assignor, by mesne assignments, to the United States of America as represented by the Secretary of War Application February 8, 1945, Serial No. 576,846

3 Claims. (Cl. 343—12)

My present invention relates to electrical apparatus, and more particularly, to object-locating systems whereby targets such as airplanes, ships, buildings, vehicles, or the like, may be detected and recognized notwithstanding the presence in the same general locality thereof, of objects, for example, large land masses, which would ordinarily tend to obscure the same.

In the so-called pulse-echo method of object detection, audio-frequency pulses of radio-frequency energy, known as exploratory pulses, are transmitted into space, and upon such pulses encountering a conducting object portions thereof, known as echoes, are reflected or reradiated. Said echoes are received back at the site of the original transmission, where they may be utilized to determine the azimuth, range, elevation, etc. of the reflecting or reradiating object. Very often, however, targets of interest are located in the vicinity of some reflecting object such as a mountain, with the result that the echoes of both the target and the mountain combine in a manner which prevents detection or recognition of the target.

It is, therefore, the main object of my present invention generally to improve object-locating systems whereby the above-mentioned disadvantage is eliminated, and targets of interest may be detected and recognized even though they be located in the vicinity of other, obscuring objects.

It is another object of my present invention to provide a radio-locating system having this highly desirable characteristic, which is simple in construction, easy to operate, and accurate in the performance of its intended functions.

These, and other objects and advantages of my present invention, which will be better understood as the detailed description thereof progresses, are attained in the following manner:

It is well known that that when electromagnetic energy is reflected from a relatively good conducting, substantially regular surface, the polarization of the reflected wave is the same as that of the incident wave. It is also well known that when such energy encounters a relatively dielectric, broken surface, it becomes depolarized. My present invention utilizes these phenomena to distinguish between targets of interest and any obscuring objects.

I provide two antennas, one being vertically disposed and the other being horizontally disposed. The first is utilized to transmit radio pulses, and then receive any vertical-polarization component in the reflected echoes. The second is only utilized to receive any horizontal-polarization component in said echoes. The signals received by the separate antennas are applied, in opposition, to the vertically-deflecting plates of an oscilloscope. Now, the polarized signals reflected from targets of interest, which are relatively good conductors and have substantially regular surfaces, will deflect the sweep trace of said oscilloscope, but the vertical and horizontal components of the depolarized signals reflected from a large land mass, which is relatively dielectric and has a broken surface, will so cancel each other as to have no effect upon said sweep trace. Thus, the obscuring object is prevented from interfering with the detection and recognition of the targets of interest.

In the accompanying specification there is described, and in the annexed drawing shown, what is at present considered a preferred embodiment of the object-locating system of my present invention. It is, however, to be clearly understood that my present invention is not limited to said embodiment, inasmuch as changes therein may be made without the exercise of invention and within the true spirit and scope of the claims hereto appended.

In said drawing, the single figure is a block diagram of an object-locating system assembled in accordance with the principles of my present invention.

Referring now more in detail to the aforesaid preferred embodiment of my present invention, and with particular reference to the drawing illustrating the same, the numeral 5 designates a master oscillator having a sine-wave output of a frequency depending, in a well known manner, upon the maximum effective range of the system. Said output is applied to a modulator 6 to distort the same and obtain substantially rectangular pulses having a repetition rate corresponding to the frequency of the oscillator 5. These pulses are utilized to key a transmitter 7 the output of which, consisting of audio-frequency pulses of radio-frequency energy, is applied, to a duplexing circuit 8. Duplexing circuit 8 is a switch which, during an outgoing radio pulse, connects the transmitter 7 to an antenna system which includes a vertically disposed dipole 9 and an appropriate parabolic reflector 10. Duplexing circuit 8, in the period between outgoing radio pulses, connects dipole 9 to a receiver 11. The output of receiver 11 is applied, through a conventional adjustable gain amplifier 12, to one of the vertically-deflecting plates 13 of a cathode ray oscilloscope 14.

A second antenna system, which includes a horizontally disposed dipole 15 and an appropriate parabolic reflector 16, is connected to a second receiver 17, and the output of the latter is applied, through another adjustable gain amplifier 18, to the vertically-deflecting plate 19 of the oscilloscope 14.

The two antenna systems described are ganged, as shown, for corresponding movement in azimuth and elevation by means of any preferred drive 20 whereby reflectors 10 and 16 have approximately parallel focal axes. A portion of the output of the master oscillator 5 is applied to a sweep generator 21 to provide a conventional linear time base, which may be applied to the horizontally-deflecting plates 22 and 23 of the oscilloscope 14.

It will be noted that the radio pulses transmitted by means of the dipole 9 are originally vertically polarized. Should these pulses come into contact with a target of interest, such as an airplane, ship, building, vehicle, or the like, which is a relatively good conductor and has substantially regular surfaces, the reflected echoes will also be vertically polarized and will be received by the dipole 9. The horizontally disposed dipole 15 will extract very little energy from echoes so polarized. These echoes are applied, through receiver 11 and the adjustable gain amplifier 12, to the plate 13 of the oscilloscope 14 whereby the sweep trace applied to the plates 22 and 23 is deflected, as at 24, to indicate the target. The large deflection 25 at the start of the trace corresponds to the originally transmitted radio pulses.

If the vertically polarized radio pulses radiated by the dipole 9 encounter an object such as a mountain, the reflected echoes, or ground return, will be substantially depolarized, and will, therefore, contain both vertical and horizontal components. The vertical components will excite the dipole 9 whereas the horizontal components will excite the dipole 15. These components will be applied, respectively through receiver 11 and adjustable gain amplifier 12, and receiver 17 and adjustable gain amplifier 18, to the plates 13 and 19 of the oscilloscope 14. The signals thus applied to the opposite vertically-deflecting plates of the oscilloscope will cancel each other, and neither of the deflections shown in broken lines on the oscilloscope trace will appear upon the screen of said oscilloscope. Therefore, even if the target of interest is in a direct line between the antennas of the object locating apparatus and the obscuring object, it will still be detected and recognized In the event that complete depolarization does not take place upon reflection from the obscuring object, the indication thereof which would normally appear on oscilloscope screen may be eliminated by manipulating the gain of the appropriate amplifier 12 or 18.

While I have disclosed, as the method of mixing the vertical and horizontal components of the depolarized signal, the application of such components to the opposing vertically-deflecting plates of an oscilloscope, it is to be understood that this is merely by way of illustration.

This completes the description of the aforesaid preferred embodiment of my present invention, together with the mode of operation thereof. It will be noted from all of the foregoing that by means of my present invention I am able to prevent large land masses from obscuring targets of interest to the operator of an object-locating system, and that the apparatus utilized for this purpose, including only standard components, requires no special skill for its operation, and attains the desired goal in an efficient manner.

Other objects and advantages of my present invention will readily occur to those skilled in the art to which the same relates.

I claim:

1. In a pulse-echo object detection system, means including an antenna for transmitting radio waves polarized in a given plane and for receiving echoes of said waves which are similarly polarized, means for including a second antenna for receiving echoes of said waves which are polarized in a plane perpendicular to said given plane; means for adjusting the amplitude of each polarization component thus received; and means for combining said polarization components in opposition, whereby reflections from objects which cause depolarization of the originally radiated energy are prevented from obscuring reflections from objects which have substantially no effect upon the polarization of said originally radiated energy.

2. In an object-locating system, the combination of a source of audio-frequency pulses of radio-frequency energy; a vertically disposed antenna for radiating said energy, and for receiving any vertically polarized reflections thereof, a horizontally disposed antenna for receiving any horizontally polarized reflections thereof; a separate adjustable gain amplifier for controlling the amplitude of each polarization component thus received; and means for combining said polarization components in opposition, whereby reflections from objects which cause depolarization of the originally radiated energy are prevented from obscuring reflections from objects which have substantially no effect upon the polarization of said originally radiated energy.

3. In a pulse-echo object detection system, means including an antenna for transmitting radio waves polarized in a given plane and for receiving echoes of said waves which are similarly polarized, means for including a second antenna for receiving echoes of said waves which are polarized in a plane perpendicular to said given plane; a separate adjustable gain amplifier for controlling the amplitude of each polarization component thus received; and an electronic indicating device for combining said polarization components in opposition, whereby reflections from objects which cause depolarization of the originally radiated energy are prevented from obscuring reflections from objects which have substantially no effect upon the polarization of said originally radiated energy.

EMMETT L. HUDSPETH.

REFERENCES CITED

The following references are of record in the file of this patent:

UNITED STATES PATENTS

| Number | Name | Date |
|---|---|---|
| 2,051,537 | Wolff | Aug. 18, 1936 |
| 2,131,042 | Halstead | Sept. 27, 1938 |
| 2,189,549 | Hershberger | Feb. 6, 1940 |
| 2,268,643 | Crosby | Jan. 6, 1942 |
| 2,310,692 | Hansell | Feb. 9, 1943 |
| 2,419,205 | Feldman | Apr. 22, 1947 |
| 2,421,028 | King | May 27, 1947 |
| 2,423,644 | Evans | July 8, 1947 |